Sept. 21, 1965 W. T. JENSEN ETAL 3,208,034

LAMINATED SOCKET WITH SOLDER-WELL TERMINALS

Filed May 28, 1962 2 Sheets-Sheet 1

INVENTORS
William T. Jensen and William J. McGinley
BY
Kemon, Palmer, Stewart & Estabrook
ATTORNEYS

LAMINATED SOCKET WITH SOLDER-WELL TERMINALS

Filed May 28, 1962 2 Sheets-Sheet 2

INVENTORS
William T. Jensen and William J. McGinley
BY
Kenyon, Palmer, Stewart & Estabrook
ATTORNEYS 3,208,034

LAMINATED SOCKET WITH SOLDER-WELL TERMINALS

William T. Jensen, Libertyville, and William J. McGinley, Palatine, Ill., assignors to Methode Electronics, Inc., Chicago, Ill., a corporation of Illinois Filed May 28, 1962, Ser. No. 198,140
4 Claims. (Cl. 339—194)

This invention relates to electron tube sockets and more particularly to tube sockets of the wafer type which include, in addition to the tube prong-receiving portions, terminal portions which also serve as solder wells for the soldered connection of other electronic circuit components. The use of solder wells on tube sockets enables a manufacturer to assemble various circuit components such as resistors, capacitors, jumpers and other components which have pre-cut and frequently preformed leads. Such components may be easily assembled into solder-well type sockets without the usual lacing or twisting techniques of hand soldering which are conventionally used in such assemblies.

Accordingly, it is the principal object of the present invention to provide a laminated wafer-type tube socket including a solder-well terminal associated with each tube prong-receiving portion to facilitate the assembly of other electrical components to be connected to a particular tube socket.

A further object of the present invention is to provide in an electron tube socket, solder wells having a triangular cross-section to facilitate the assembly therein of connecting wires from additional electrical components.

Other objects of the present invention will become apparent from the following description when read in conjection with the attached drawings in which.

In general, the objects of the invention are achieved by providing a pair of superposed disc-like insulating members of substantially identical external configuration. The tube prong openings are annularly arranged and extend in alignment through both of the insulated members, while the openings for the solder wells are also annularly arranged and extend only through the bottom member of the insulating pair. Each connector member includes a tube-prong receiving portion which is received within the inner circle of openings in the bottom insulated member and a solder-well terminal portion which is received through the outer series of openings in the bottom insulating member and the two portions are joined by an integral flat strap which extends between the outer edge of the tube-prong receiving portion and the outer edge of he solder-well portion in order to close off the upper end of each solder well. The flat strap portions are received between the two superposed insulating members which are held together by a centrally located rivet or grommet.

Figure 3:
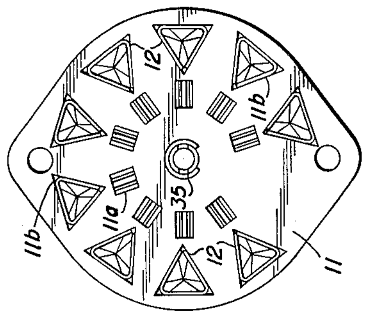
FIG. 3 is a bottom plan view of the same socket.
Figure 2:
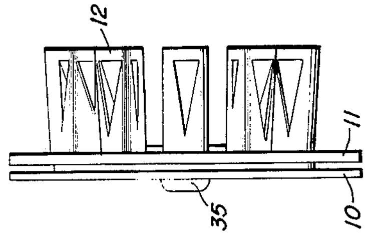
FIG. 2 is a side elevation of the socket shown in FIG. 1.
Figure 1:
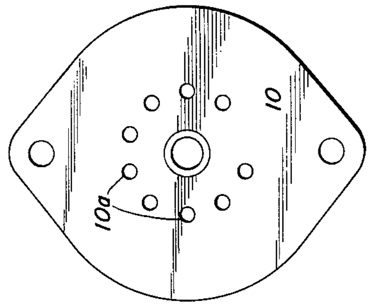
FIG. 1 is a top plan view of an electron tube socket in accordance with the present invention.

Referring now to the drawings for a more complete description of the present invention, FIGS. 1, 2 and 3 show respectively top plan, side elevation and bottom plan views of a preferred embodiment of the present invention in its assembled form. As clearly shown therein, each socket includes a pair of disc-like insulating members 10 and 11 and a plurality of connector members designated generally by the reference numeral 12. Insulating member 10 has an annularly arranged series of circular openings 10*a* through which the prongs of an electron tube will be inserted. Insulating member 11 has an annularly arranged series of rectangular openings 11*a* and concentrically therewith, an outer annularly arranged series of triangular openings 11*b*.

Referring now to FIGS. 4 to 7 inclusive for a detailed description of the connector members, the tube-prong receiving portions 13 include a pair of spring fingers 14 and 15 which extend toward each other and then flare outwardly to define therebetween a narrow gripping opening through which the individual prongs of an electron tube are inserted and firmly held. On the upper surface of the connector member, directly above the contact fingers 14 and 15 as shown most clearly in FIG. 6, an opening 16 is provided giving access to the members 14 and 15 for the prongs of a tube to be inserted.

Figure 4:
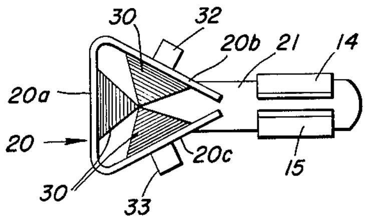
FIG. 4 is a bottom plan view of one of the connector members.
Figure 5:
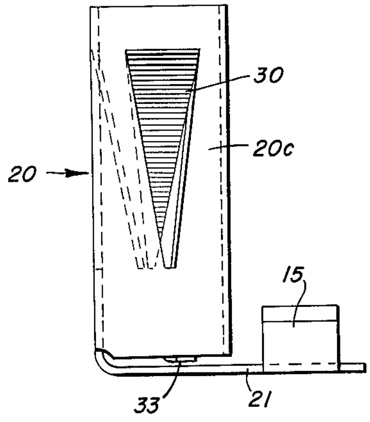
FIG. 5 is a side elevation of the connector member shown in FIG. 4.
Figure 7:
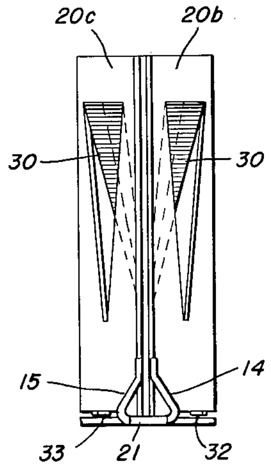
FIG. 7 is an elevational view of FIG. 5 as seen from the right of FIG. 5.

The solder-well portion 20 of the connector member is of tubular form, preferably triangler in cross-section, as shown in FIG. 4.

Preferably the entire connector is formed from a single metallic blank so that the remaining major portion of the connector member comprises an integral flat strap 21 which extends from the outermost side of the solder well 20, overlies the upper open end of the solder well and forms a positive electrical connection between the solder well and the tube-prong receiving portion 13.

Figure 6:
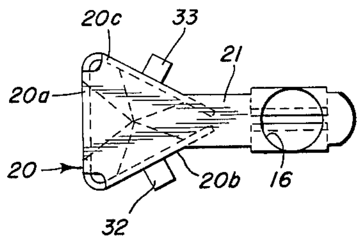
FIG. 6 is a top plan view of the same connector member.

FIGS. 4 to 7 show in detail the configuration and structure of the solder-well portion. As shown in FIGS. 4 and 6, the solder-well portion is formed of three flat walls arranged about a common axis to form a triangular tube. The three flat walls are formed from a single piece of sheet metal and include a middle wall 20*a* flanked by two outer or wing walls 20*b* and 20*a*. The flat strap portion 21 is a continuation of the middle wall 20*a* which faces outwardly from the center of the socket and the strap 21 extends back towards the center of the socket. When the three flat walls are formed into tubular shape, the outer side edges of the wing walls 20*b* and 20*c* are positioned close to each other and form one apex of the triangular tube directed towards the center axis of the socket. From each of the three flat walls which define the triangular cross-sectional configuration of the solder well, a tongue or finger portion, preferably triangular outline, is struck from the side wall and bent inwardly. These struck-in portions identified by the reference numeral 30 converge toward each other as shown most clearly in FIGS. 4, 5 and 7 and constitute spring fingers which serve the purpose of temporarily holding the conductive leads of other circuit components such as resistors, condensers and the like, which leads are inserted into the open end of the solder well prior to making a permanent soldered joint.

In some cases, it may be desirable that the solder wells do not extend at a true right angle from the connecting strap 21 and, likewise, from the flat surface of the insulating members 10 and 11, but rather that the wells diverge outwardly of each other. Stated in another way, the solder wells in assembled relationship in the socket may lie in a frusto-conical surface of revolution, the small end of which would be at the supported ends of the solder well portions, and the larger end of the surface would be at the free ends of the solder wells. In order to fix the particular angle of the solder well to the flat connecting strap, the upper edges of the two wing walls may be cut at the proper angle and a pair of ear members or tabs are formed and bent outwardly from the upper end of the two wing walls of the solder well. These tabs indicated by the reference numerals 32 and 33 appear most clearly in FIGS. 4 and 6. These are useful not only to fix the annular position of the well with respect to the strap, but also they serve to strengthen the assembled connector and make it less liable to damage during manufacture and/or subsequent handling. Of course, the tabs 32 and 33 are not essential and may be omitted if desired.

In assembling electron tube socket from parts which have been described above, a plurality of connector members equal in number to the number of openings in either series of openings through the lower insulating member 11 are positioned with the solder-well portions extending through the outer circle of triangular openings and the tube-prong receiving portions received within the inner circle of rectangular openings 11*b*, the flat connector strap 21 then overlying the member 11 between the outermost edge of the inner series of openings 11*a* and the outermost edge of the outer series of openings 11*b*. The upper insulating member 10 is then positioned over the member 12 with the prong-receiving openings 10*a* in alignment with the openings 11*a* in the number 11 and the two members are then fixed in position, preferably by means of a rivet or grommet 35.

From the foregoing it will be seen that the three resilient fingers or tongue portions 30 are struck from flat surfaces and remain in flat form even when bent inwardly. This structure retains a proper amount of resiliency in the tongue elements, which would not be the case if the tubular solder well were formed as circular tubes which would involve transverse buckling of the finger elements when the flat blank is rolled into a tube.

The triangular shape of the solder-well, with the three resilient tongues extending inwardly from three walls of the well, provides an arrangement where the terminal wires or leads of components to be connected to the socket terminal are guided to the center of the terminal by the resilient tongues, and the three corners of the well provide convenient locations in which to habitually orient a particular lead of a particular component. The three corners of the well also provide for the easy feeding of wire solder and "puddling" of the solder in the corners by bringing a small wattage soldering iron into contact with the outer wall of the solder well adjacent the corner in which the connection leads are located.

Another advantage of the present construction is in the use of a wedge-shaped contact portion formed of the spring clips 14 and 15 which are located within rectangular apertures formed in the lower wafer of the socket. This type of contact is less vulnerable to high tube insertion forces which would be present if the tube pins are not properly aligned.

From the foregoing, it will be apparent that there is herein shown and described a new and useful form of electron tube socket of the type which includes solder wells. While a preferred embodiment has been illustrated and described, variations will occur to those skilled in this art and applicants claim the benefit of a full range of equivalents within the scope of the appended claims.

We claim:

1. A laminated wafer type electron tube socket comprising in combination: first and second flat disk-like insulating members arranged in superposed relation; means defining a first annularly arranged series of aligned openings through said first and second members; means defining a second equal number of annularly arranged series of openings through said first member spaced radially outwardly of and concentric with said first series of openings; a plurality of tube prong-receiving connectors, one received in each of said first series of openings in said first member, each of said connectors including, in addition to the prong-receiving portion, an elongated solder-well portion extending through one of said second series of openings and axially of said first member, said solder-well portion and said tube prong-receiving portion of each connector being connected by a flat strap portion located between said insulating members, said solder-well portion being a hollow tube triangular in cross-section, closed at the end adjacent said members by said flat strap portion and open at its outer end and having spring means comprising fingers struck out from the side walls of said solder-well for gripping conductors inserted in the open end thereof for soldering; and means for holding said first and second members in engagement with said strap portion.

2. A tube socket as defined by claim 1 in which the longitudinal axes of said solder-wells lie in a frusto-conical surface of revolution the small end of which is at the closed ends of said wells.

3. A tube socket as defined by claim 2 in which the closed end of each solder-well includes a pair of tabs extending outwardly of the walls of said solder-well, abutted by said flat strap, and serving to fix the angular position of each solder-well with respect to the longitudinal axis of the socket.

4. An electron tube socket comprising in combination: first and second flat, disk-like insulating members arranged in superposed relation; means defining a first annularly arranged series of aligned openings through said first and second members; means defining a second equal number of annularly arranged series of opening through said first member spaced radially outwardly of and concentric with said first series of openings; a plurality of tube prong receiving connectors one being received in each of said first series of openings in said first member, each of said connectors including in addition to said tube prong receiving portions, an elongated hollow solder well portion, triangular in cross-section, having spring fingers struck out and extending inwardly from each side wall, said tube prong receiving portion and said solder well portion of each connector being joined by a flat strap integral with both and extending between said first and second insulating member and between the outer edge of said tube prong receiving portion to the outer edge of said solder well portion in order to close said solder well portion, said solder well portion also having a pair of tabs integral therewith and extending exteriorly transversely thereof to fix the angular position between said flat strap and said solder well portion, said flat strap being in contact with the surface of said first member between said first and second series of openings; and means for positively holding said first and second members in closely spaced parallel engagement with said strap portion.

References Cited by the Examiner

UNITED STATES PATENTS

| | | | |
|---|---|---|---|
| 2,486,115 | 10/49 | Chiuchiolo | 339—242 |
| 2,559,174 | 7/51 | Skony | 339—258 |
| 2,723,384 | 11/55 | Lang | 339—194 |
| 2,745,081 | 5/56 | Offerman | 339—194 |
| 2,825,881 | 3/58 | Del Camp | 339—194 X |
| 2,866,171 | 12/58 | Wagner et al. | 339—193 |
| 3,060,402 | 10/62 | Olsson et al. | 339—220 |

FOREIGN PATENTS

| | | |
|---|---|---|
| 1,256,090 | 2/61 | France. |
| 363,388 | 12/31 | Great Britain. |
| 875,002 | 8/61 | Great Britain. |

JOSEPH D. SEERS, *Primary Examiner.*